United States Patent [19]
Pradel

[11] Patent Number: 5,860,498
[45] Date of Patent: Jan. 19, 1999

[54] SHOCK ABSORBER FOR A MOTOR VEHICLE

[75] Inventor: Robert Pradel, Heidenfeld, Germany

[73] Assignee: Fichtel & Sachs AG, Schweinfurt, Germany

[21] Appl. No.: 738,226

[22] Filed: Oct. 25, 1996

[30] Foreign Application Priority Data

Oct. 27, 1995 [DE] Germany .......................... 195 40 049.6

[51] Int. Cl.⁶ ..................................................... F16F 9/00
[52] U.S. Cl. ....................................................... 188/322.19
[58] Field of Search .................................... 188/315, 318, 188/322.15, 322.19

[56] References Cited

U.S. PATENT DOCUMENTS

| | | | |
|---|---|---|---|
| 5,375,683 | 12/1994 | Huang et al. | 188/322.13 |
| 5,398,787 | 3/1995 | Woessuer et al. | 188/315 |
| 5,603,392 | 2/1997 | Beck | 188/299 |
| 5,607,035 | 3/1997 | Fulks et al. | 188/322.19 |
| 5,620,172 | 4/1997 | Fulks et al. | 267/221 |
| 5,649,611 | 7/1997 | Nakadate | 188/322.13 |

FOREIGN PATENT DOCUMENTS

| | | |
|---|---|---|
| 3831718 | 3/1990 | Germany . |
| 3922155 | 1/1991 | Germany . |
| 4310341 | 8/1994 | Germany . |
| 4342883 | 6/1995 | Germany . |
| 4406350 | 9/1995 | Germany . |

Primary Examiner—Robert J. Oberleitner
Assistant Examiner—Chris Schwartz
Attorney, Agent, or Firm—Nils H. Ljungman and Associates

[57] ABSTRACT

A shock absorber for a motor vehicle has a single-tube construction with an adjustable damping force. The shock absorber includes a cylinder tube and a piston rod guide inside which a piston rod with a piston is located so that the piston can move axially. The piston divides the cylinder tube into two work chambers. A container tube encloses the cylinder tube, at least in segments. Between the cylinder tube and the container tube at least one hydraulic connection, extending from one of the work chambers via an overflow orifice to a damping force adjustment valve located outside the container tube, is formed. A cylinder tube guide centers the cylinder tube with respect to the container tube. The damping force adjustment valve has two connection openings, one of which openings is separated from the other by a wall. The damping force adjustment valve is connected to the hydraulic connection, so that the container tube extends over the entire length of the hydraulic connection to the piston rod guide. The seal of the container tube is realized on the piston rod guide.

20 Claims, 10 Drawing Sheets

SHOCK ABSORBER FOR A MOTOR VEHICLE

BACKGROUND OF THE INVENTION

Field of the Invention

Generally, the present invention relates to a shock absorber or vibration damper which has a single-tube construction with an adjustable damping force, comprising a cylinder tube, a piston rod guide inside which a piston rod with a piston is located so that the piston can move axially and divide the cylinder tube into two work chambers, a container tube which encloses the cylinder tube at least in segments, whereby between the cylinder tube and the container tube at least one hydraulic connection running from one of the work chambers by means of an overflow orifice to a damping force adjustment valve located outside the container tube is formed, a cylinder tube guide which centers the cylinder tube with respect to the container tube, whereby the damping force adjustment valve has two connection openings, one of which openings is separated from the other by a wall and is connected to the hydraulic connection.

Background Information

A similar vibration damper is described, for example, in German Patent No. 43 10 341 C1. On both its ends, the cylinder tube has portions with increased diameters which axially limit or define the hydraulic connection between the upper work chamber and the external damping force valve. This design principle necessarily requires that the connection between the container tube and the cylinder tube must be very carefully welded and then tested for leaks. An encircling weld seam is not very difficult to lay down from a manufacturing point of view, but the subsequent tests represent a much greater problem, and a defective weld seam results in the scrapping of the entire cylinder tube and container tube.

Moreover, on known connections between a container tube and the cylinder tube, it is always necessary to reduce the diameter of the container tube to the diameter of the cylinder tube. Consequently the wall strength of the container tube will be limited. It is no surprise that strength problems can result.

OBJECT OF THE INVENTION

The object of the present invention is to realize a vibration damper with an adjustable damping force in which the manufacturing expense for the components which form the hydraulic connection is limited.

SUMMARY OF THE INVENTION

The present invention teaches that this object can be accomplished, in accordance with at least one preferred embodiment, by an arrangement in which the container tube extends over the entire length of the hydraulic connection to the piston rod guide and the seal of the container tube is realized on the piston rod guide.

The seal of the container tube, which seal is displaced onto the piston rod guide, makes it possible to do without a hydraulically tight connection between the container tube and the cylinder tube. Consequently, it becomes possible to dispense with the complex, time-consuming and expensive leak test. Furthermore, the flow of forces inside the vibration damper is improved, starting from a connecting point on the container tube to an additional connection on the piston rod, since the load is essentially removed from the cylinder tube. A container tube which has a constant diameter can be used. The result is a greater oil volume in the vibration damper, or also a greater diameter for a decompression stop spring.

In other words, by moving the hydraulically tight connection onto the piston rod guide and away from the connection between the container tube and the cylinder tube, the need to perform a complex and expensive leak test on the container tube and cylinder tube connection is avoided. The result of moving the hydraulically tight connection is that the upper work chamber is extended above the connection between the container tube and cylinder tube which, thus, removes the need for a hydraulically tight connection between the container tube and cylinder tube because any leaking oil will flow into the upper work chamber. The removal of the leak test for the connection between the container tube and cylinder tube can allow the manufacturing process to be performed more efficiently and economically.

In an additional advantageous feature, the invention teaches that the cylinder tube has a positive or interlocking retaining connection to the container tube in the vicinity of the cylinder tube guide. The decision not to use a hydraulically tight seal, as is necessary in similar devices of the prior art, between the container tube and the cylinder tube makes this type of construction possible.

In other words, by positioning the hydraulically tight seal away from the connection between the container tube and cylinder tube, other types of connections may be utilized, even if not hydraulically tight, because any leakage will flow into the upper work chamber which is extended above the connection.

In one embodiment, the retaining connection is formed by an expanded-diameter portion of the cylinder tube and at least partial beads of the container tube, whereby the beads of the container tube are located above and below the cylinder tube guide. The cylinder tube can be introduced easily into the container tube during assembly, and comes into contact with the bead or beads previously shaped in the container tube. Then the bead located above the cylinder tube guide can be machined in.

The overflow opening from the upper work chamber into the hydraulic connection is formed simply by an indentation of the cylinder tube guide. The result is a very large opening which does not allow the occurrence of any throttling losses.

Alternatively, the overflow opening from the upper work chamber into the hydraulic connection can be formed by at least one slot in the cylinder tube guide or in the vicinity of the cylinder tube guide.

In an additional variant, the cylinder tube can be connected to the container tube via the cylinder tube guide by means of a weld. The welding of the cylinder tube guide makes it possible to work with larger tolerances in the length of the cylinder tube. As indicated above, a leak test is unnecessary.

The cylinder tube guide can also be formed by a collar which is folded at least once, which collar has a radial dimension which corresponds to the circular cross sectional area of the hydraulic connection. The formation of the collar makes the cylinder tube significantly more rigid. The collar is thereby formed by slotted webs which have a reduced diameter in the area which runs essentially parallel to the container tube. Engaged in this reduced-diameter area is a bead which at least partly encircles the container tube and fixes the cylinder tube in position.

The above discussed embodiments of the present invention will be described further hereinbelow with reference to the accompanying figures.

BRIEF DESCRIPTION OF THE DRAWINGS

The invention is explained in greater detail below with reference to the accompanying drawings, wherein.

DESCRIPTION OF THE PREFERRED EMBODIMENT

Figure 1:
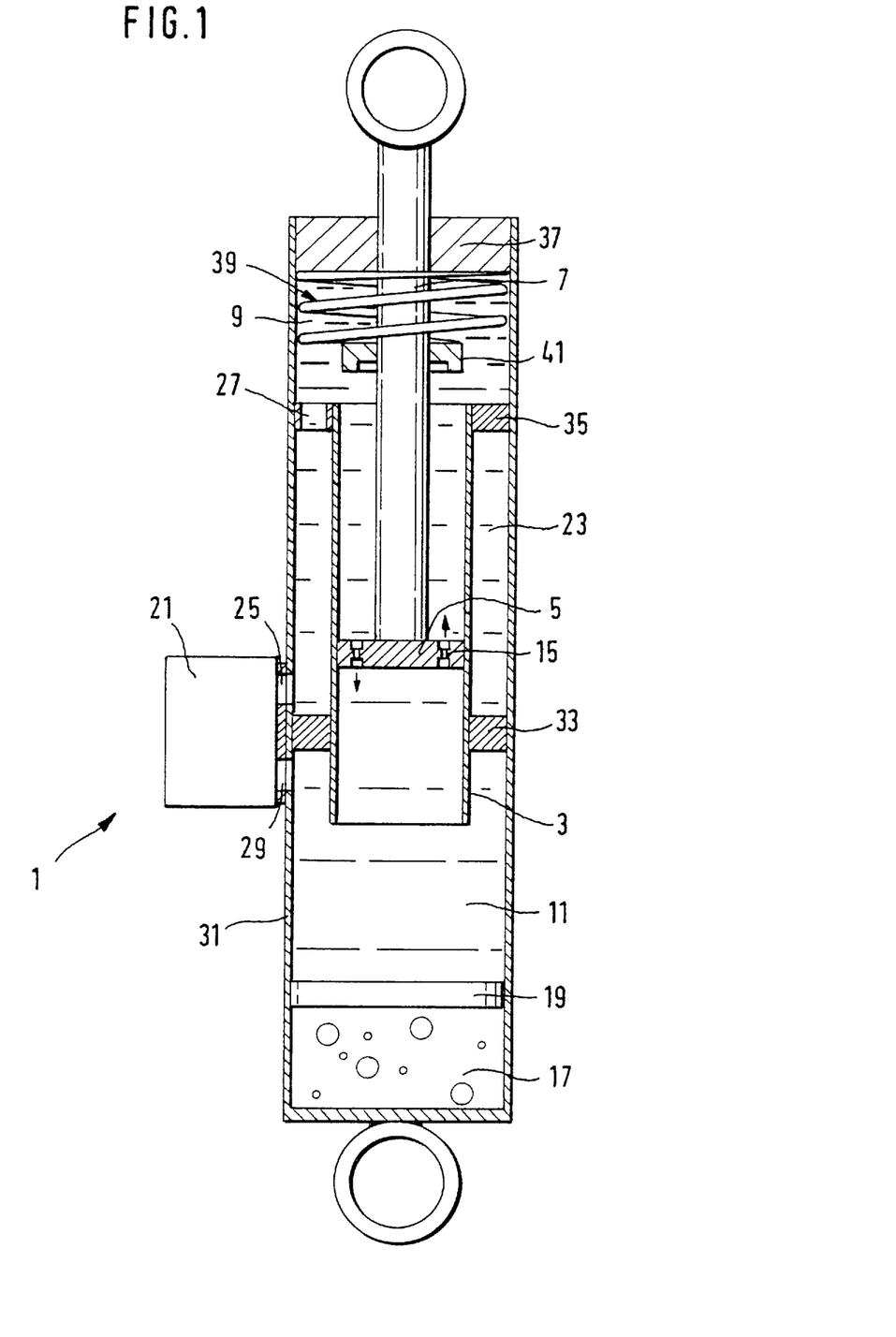
FIG. 1 is a schematic diagram of a vibration damper.

FIG. 1 is a simplified drawing which shows a vibration damper 1 with an adjustable damping force. The vibration damper 1 includes, among other things, a cylinder tube 3, in which a piston 5 on a piston rod 7 divides the cylinder tube 3 into two work chambers, an upper work chamber 9 and a lower work chamber 11. Optionally, damping valves 15 can be located in the piston 5. This vibration damper 1 is a vibration damper which is preferably designed according to the single tube principle, so that adjacent to the lower work chamber 11 there can be an equalization chamber 17 which is closed by a separating piston 19.

The damping force adjustment can be accomplished by means of a damping force adjustment valve 21 which can be connected to the upper work chamber 9 by means of a hydraulic connection 23. A connecting opening 25 allows the hydraulic connection 23 to empty into the damping force adjustment valve 21. An overflow opening 27 may connect the upper work chamber 9 with the hydraulic connection 23. The damping force adjustment valve 21 preferably has an additional connecting opening 29 which connects the lower work chamber 11. The hydraulic connection 23, which may have a circular cross section, is formed by the cylinder tube 3 and a container tube 31 which surrounds the cylinder tube 3, at least in segments. A wall 33 can form the end of the hydraulic connection 23 and seal it off from the lower work chamber 11. During the preferred operation of the vibration damper 1, the volume of the piston rod 7, as the piston rod 7 is inserted and extended, is displaced in the form of damping medium, and is pumped in both directions through the hydraulic connection 23 as a function of the switching of the damping force adjustment system, whereby the wall 33 is exposed to loads from alternating directions.

On the upper end of the cylinder tube 3, there is schematically shown a cylinder tube guide 35 which preferably centers the cylinder tube 3 with respect to the container tube 31 and may fix the cylinder tube 3 in place. The container tube 31 extends beyond the cylinder tube guide 35 to a piston rod guide 37, to which the container tube 31 is sealed with respect to the environment, whereby a uniform cross section of the container tube 31 can be maintained. This cross section can be used, for example, for a relatively generously-sized decompression stop spring 39 which may be supported on a spring guide part 41 of the piston rod 7.

Figure 2:
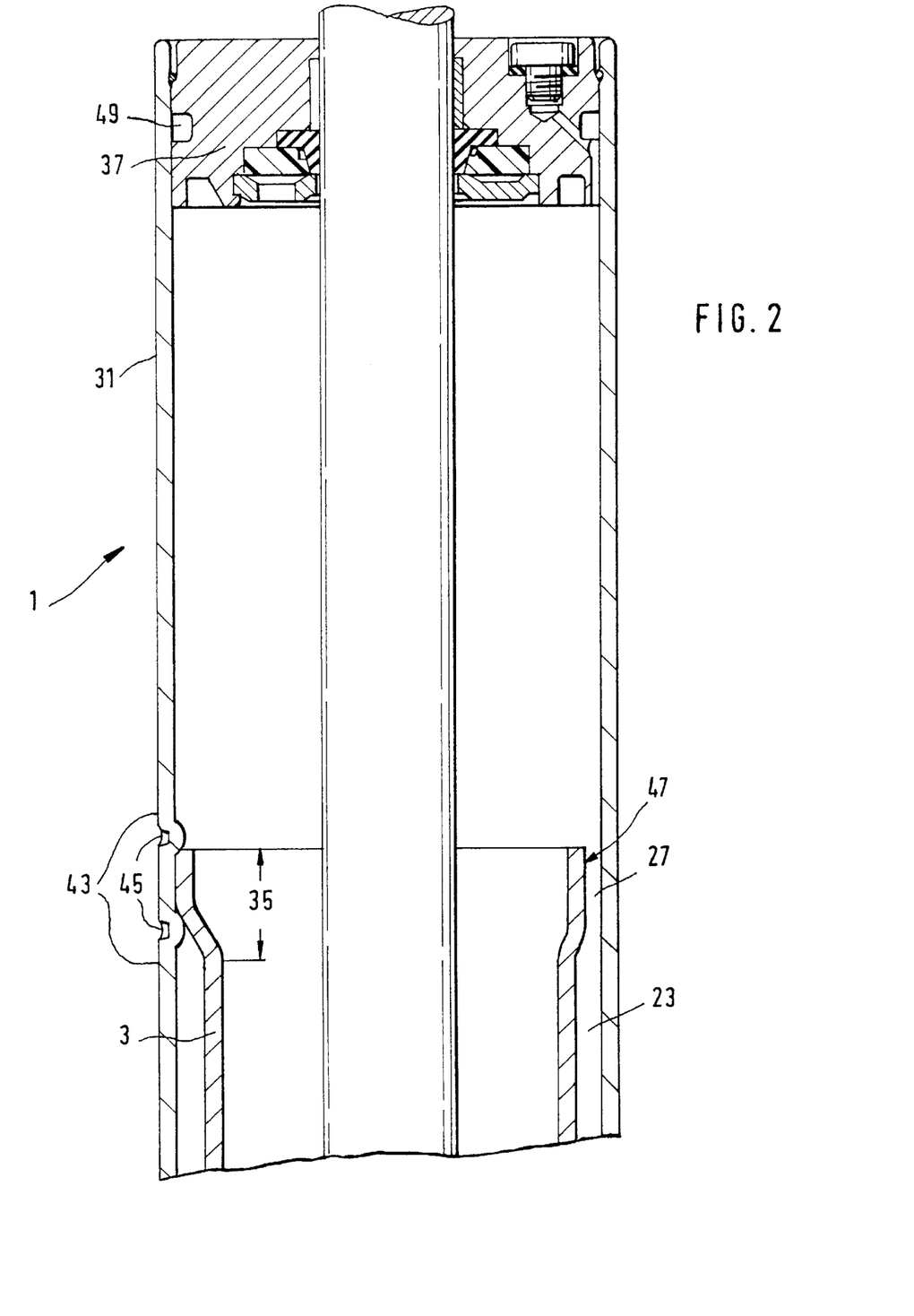
FIGS. 2–6 illustrate embodiments of a cylinder guide tube.

FIG. 2 is restricted to the segment of the vibration damper 1 which has the cylinder tube guide 35. In this embodiment, the cylinder tube 3 can be fixed by means of a positive or interlocking connection 43 between the cylinder tube guide 35 and the container tube 31. The positive or interlocking connection 43 may include a portion of the cylinder tube 3 with an expanded diameter which forms the cylinder tube guide 35, on which cylinder tube guide 35, above and below, at least partial beads 45 of the container tube 31 are located.

During the assembly, the cylinder tube 3 may be placed in contact with the beads 45 which have already been formed in the container tube 31. Then the container tube 31 may be secured axially by the beads 45 located above the cylinder tube guide 35. The overflow opening 27 into the hydraulic connection 23 can be formed by an indentation 47 inside the cylinder tube guide 35.

This illustration shows the seal of the container tube 31 can be accomplished by means of a gasket 49 in the piston rod guide 37. In the embodiment as illustrated in FIG. 2 the positive or interlocking connection 43 may include a cylinder tube guide 35 which is formed from expanding the diameter of the cylinder tube 3. The container tube 31 may have beads 45 which are above and below the cylinder tube guide 35 to position the cylinder tube guide 35 within the container tube 31.

Figure 3:
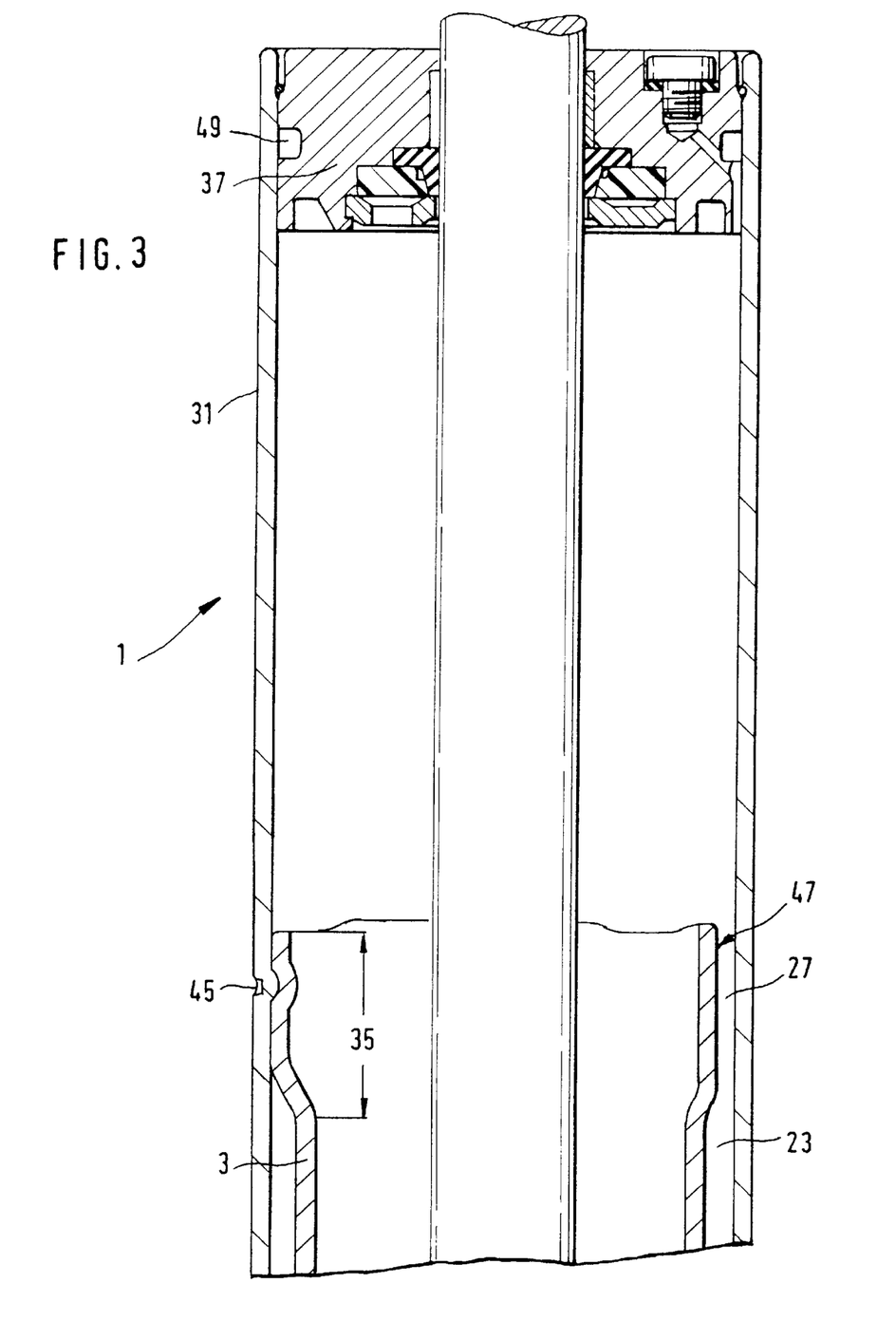
Figure 4:
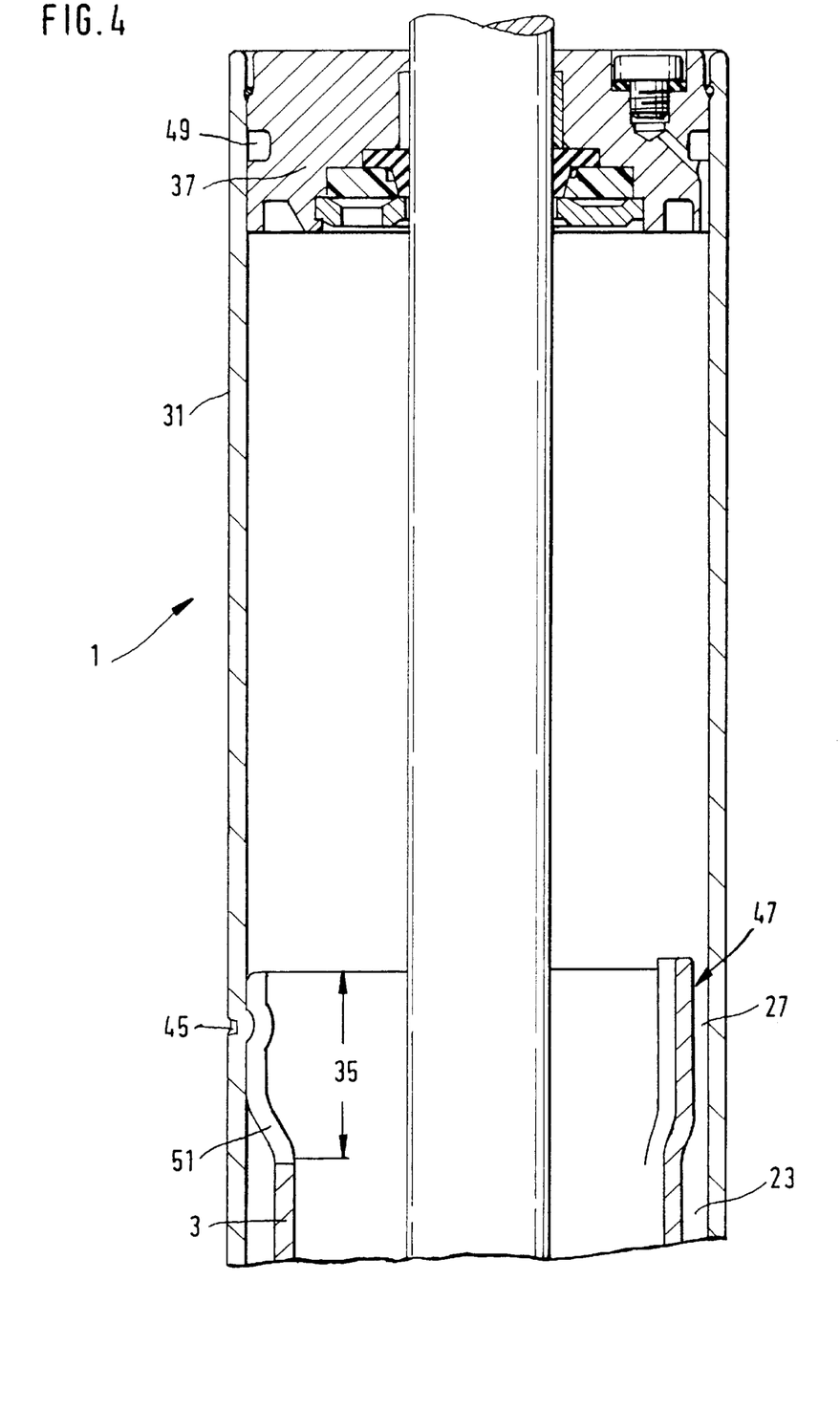
Figure 5:
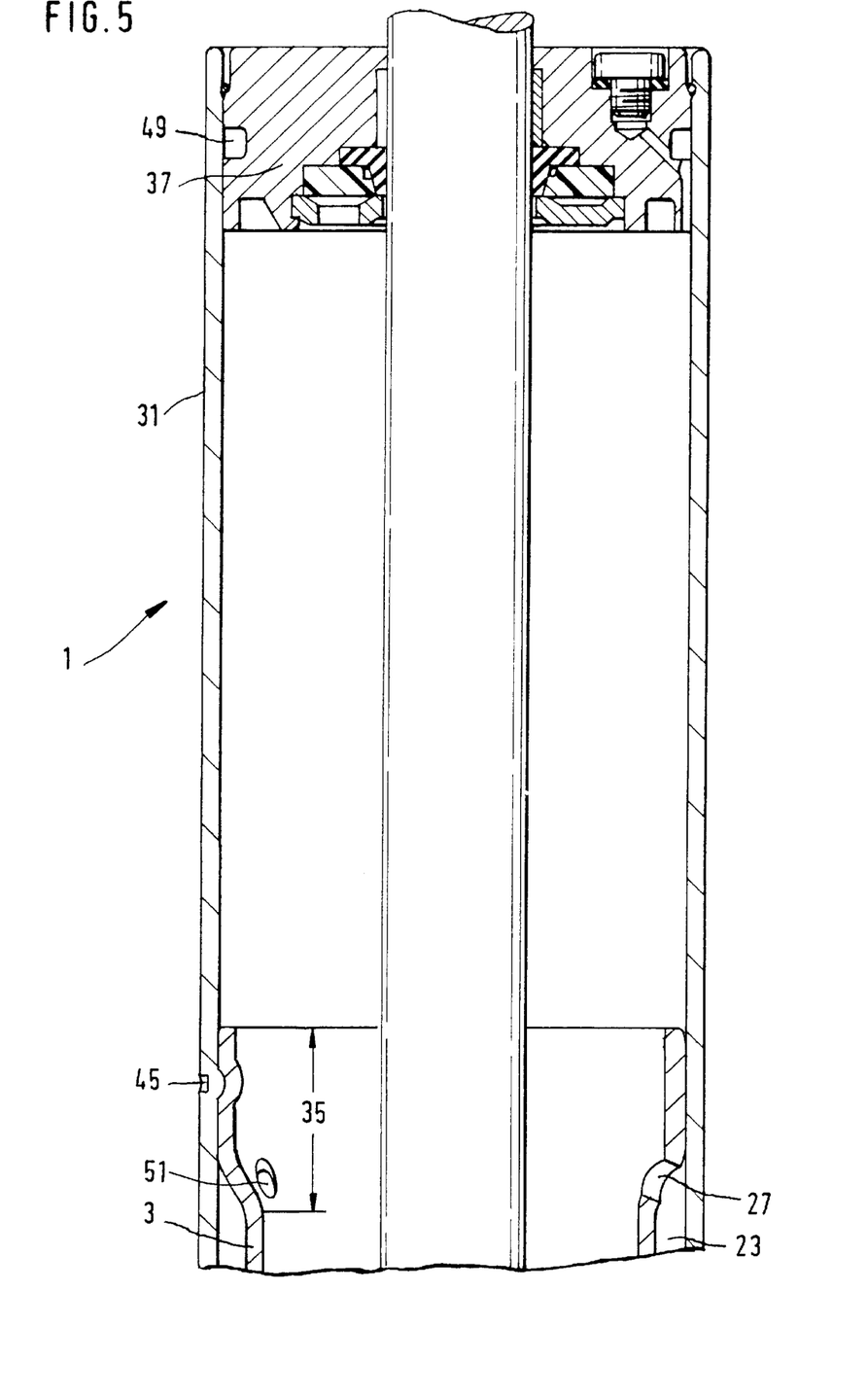

FIG. 3 shows that, in contrast to FIG. 2, the cylinder tube 3 can also be fastened securely by means of an arrangement of single beads 45. FIG. 4 also shows that the cross section of the overflow opening 27 can be enlarged by additional slots 51, if these slots 51 are realized in the cylinder tube guide 35, for example. As an additional consequence, the cylinder tube 3 can be assembled relatively easily because of the elasticity resulting from the slots 5 and because the beads 45 can be machined into the container tube 31 even before the assembly. The cylinder tube guide 35 and the beads 45 in the container tube 31 thereby can form a snap-in connection. On the other hand, the embodiment illustrated in FIG. 5 where the cylinder tube guide 35, which runs all the way around or is adjacent to the periphery of the container tube 31, is provided for vibration dampers which are subject to particularly high stresses. In this embodiment, as illustrated in FIG. 5, the overflow opening 27 can be realized in the form of a hole, punched-out section or slot 51 in or adjacent to the cylinder tube guide 35. In this embodiment, as illustrated in FIG. 5, the slot 51 in or adjacent to the cylinder tube guide 35 may be configured different from the slots shown in FIG. 4.

Figure 6:
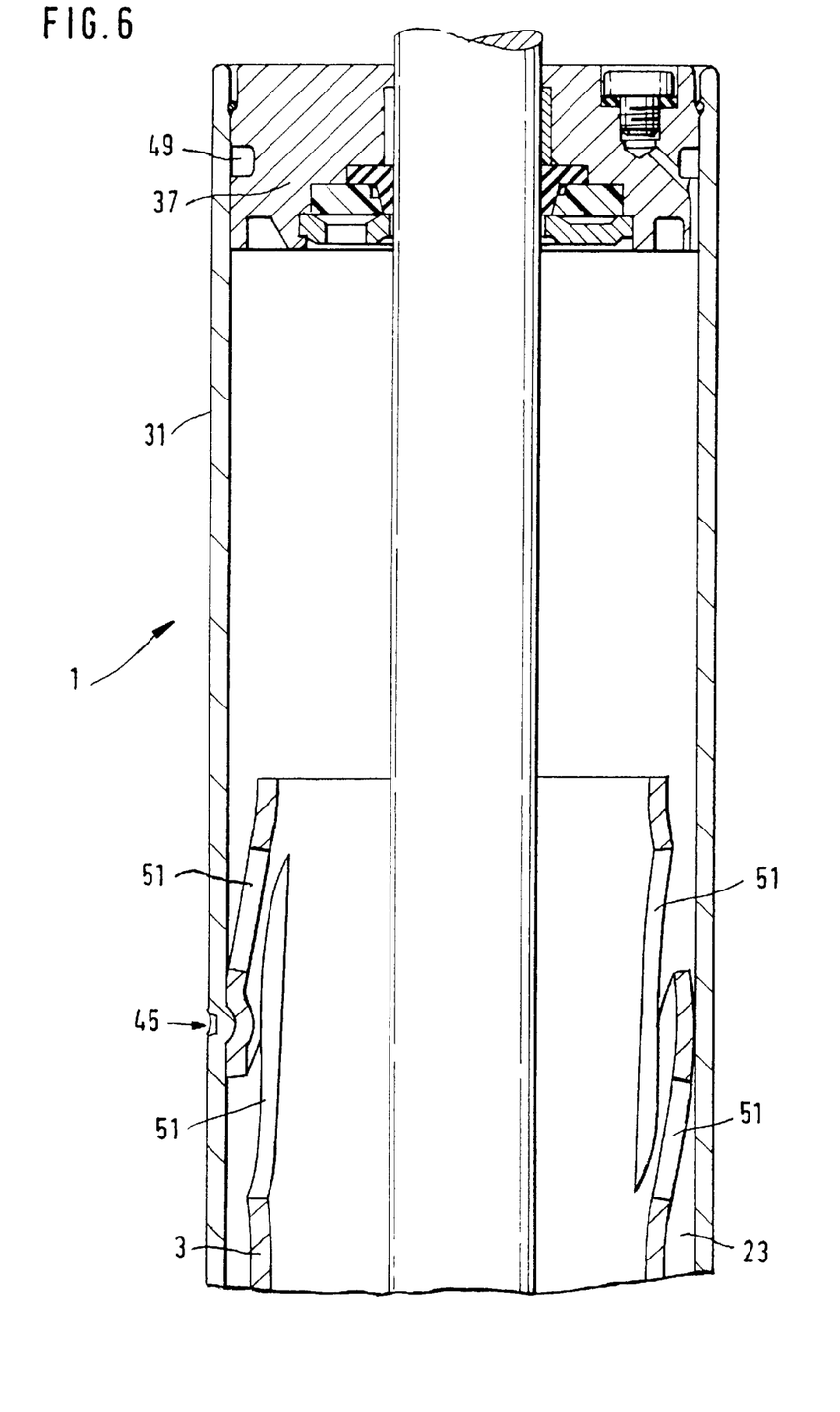
Figure 6A:
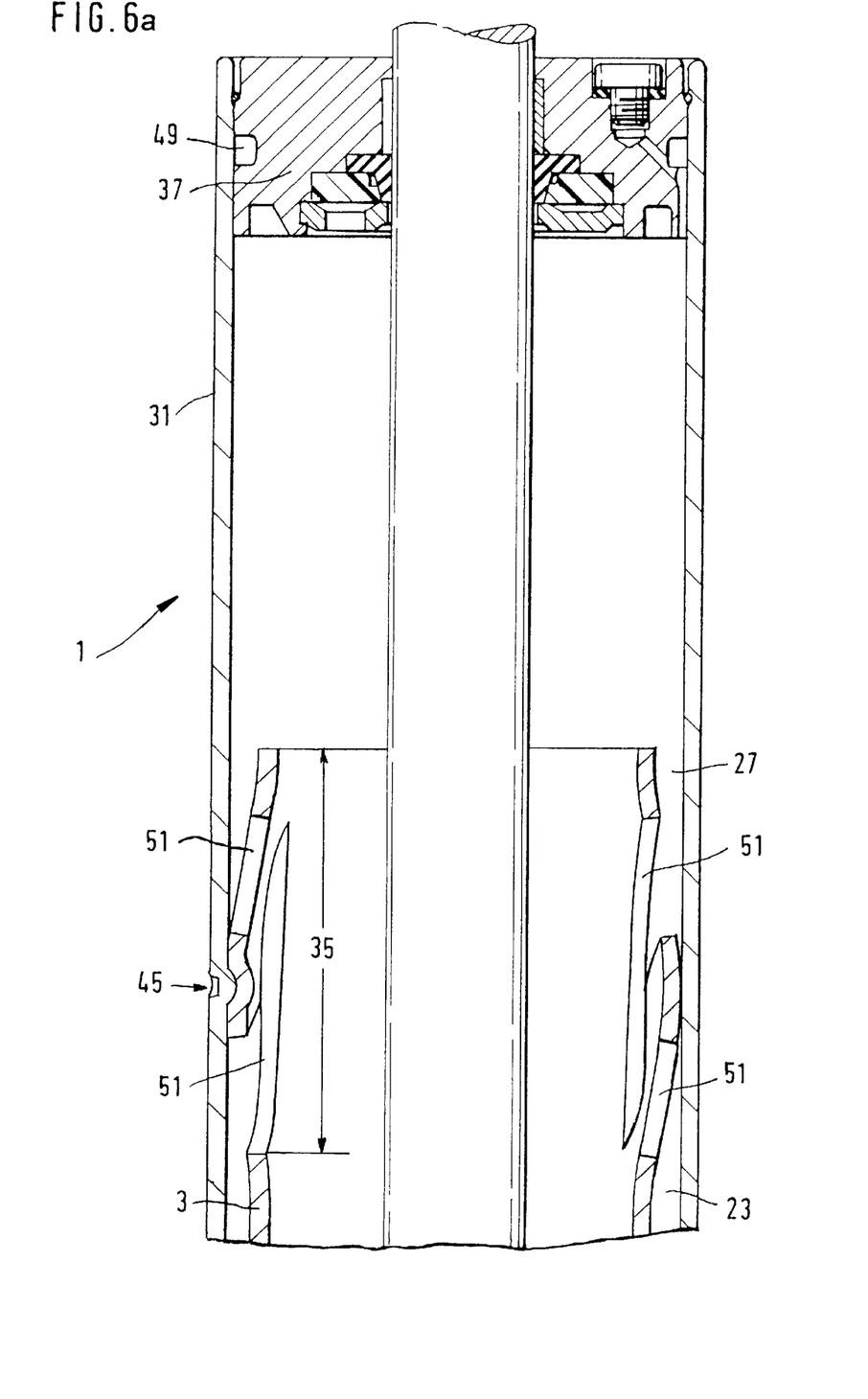
FIG. 6a illustrates additional features of the cylinder guide tube of FIG. 6.

FIG. 6 shows a cylinder tube guide 35 (see FIG. 6a) which may contain a plurality of slots 51, in which the plurality of slots 51 are distributed over the periphery of the cylinder tube 3, which makes it possible to widen the cylinder tube 3. The plurality of slots 51 also can form the overflow opening 27 (see FIG. 6a) into the hydraulic connection 23. In this embodiment, as illustrated in FIG. 6, the plurality of slots 51 in the cylinder tube guide 35 may be configured differently from the slots shown in FIGS. 4 or 5.

Figure 7:
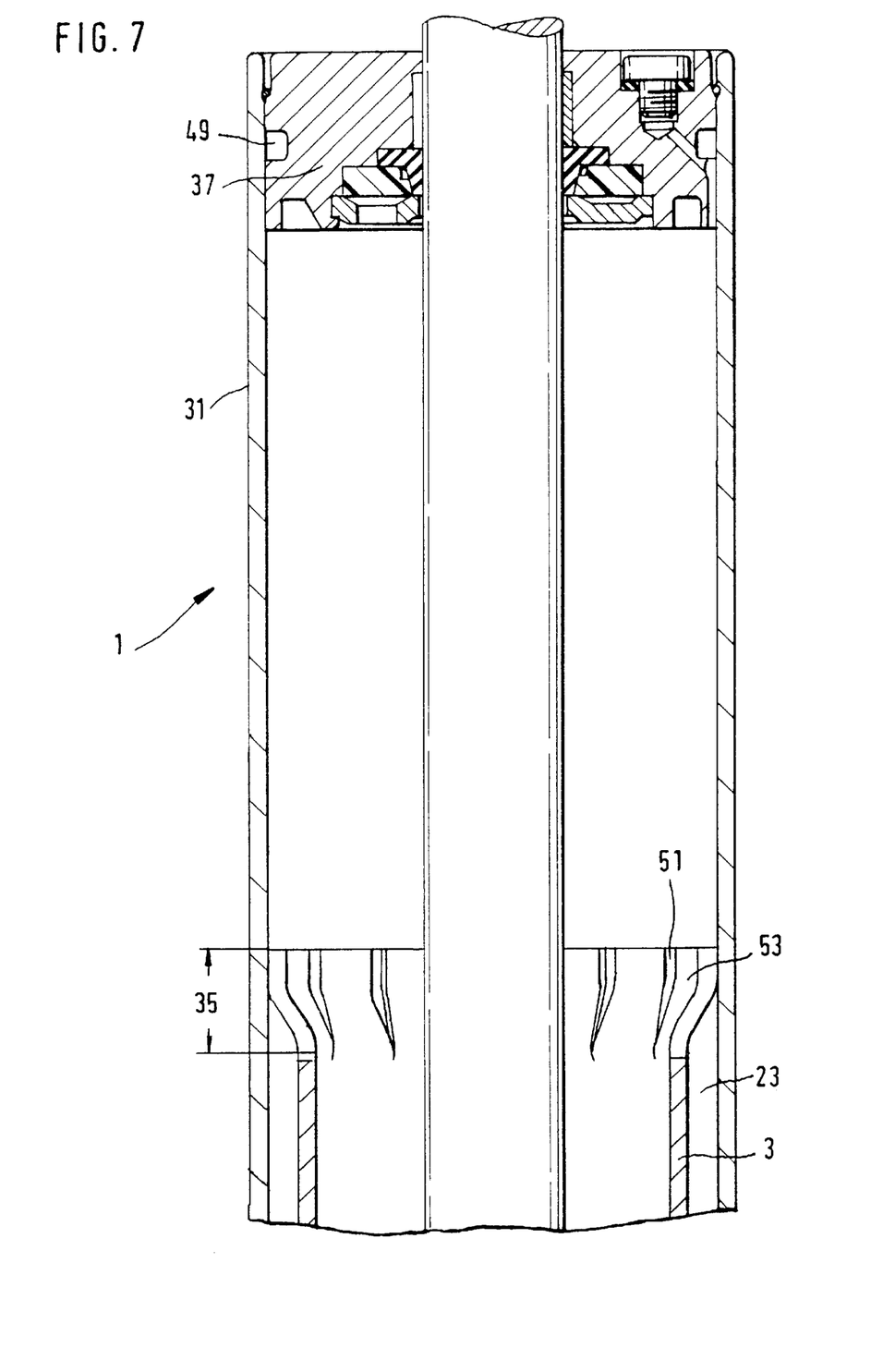
FIGS. 7–9 illustrate embodiments of a cylinder guide tube.

An additional variant is illustrated in FIG. 7, in which the open end of the cylinder tube 3 can have a plurality of slots 51 and be widened. Remaining sheet metal strips 53 can be pressed into the surface of the container tube 31 during the expansion, and thereby create a particularly solid connection. In the embodiment illustrated in FIG. 7, the plurality of slots 51 in the cylinder tube guide 35 may be configured differently from the slots 51 in FIGS. 4, 5 and 6. Also, in the embodiment illustrated in FIG. 7, the sheet metal strips 53 may be formed from the remaining metal of the cylinder tube guide 35 after the plurality of slots 51 are inserted.

Figure 8:
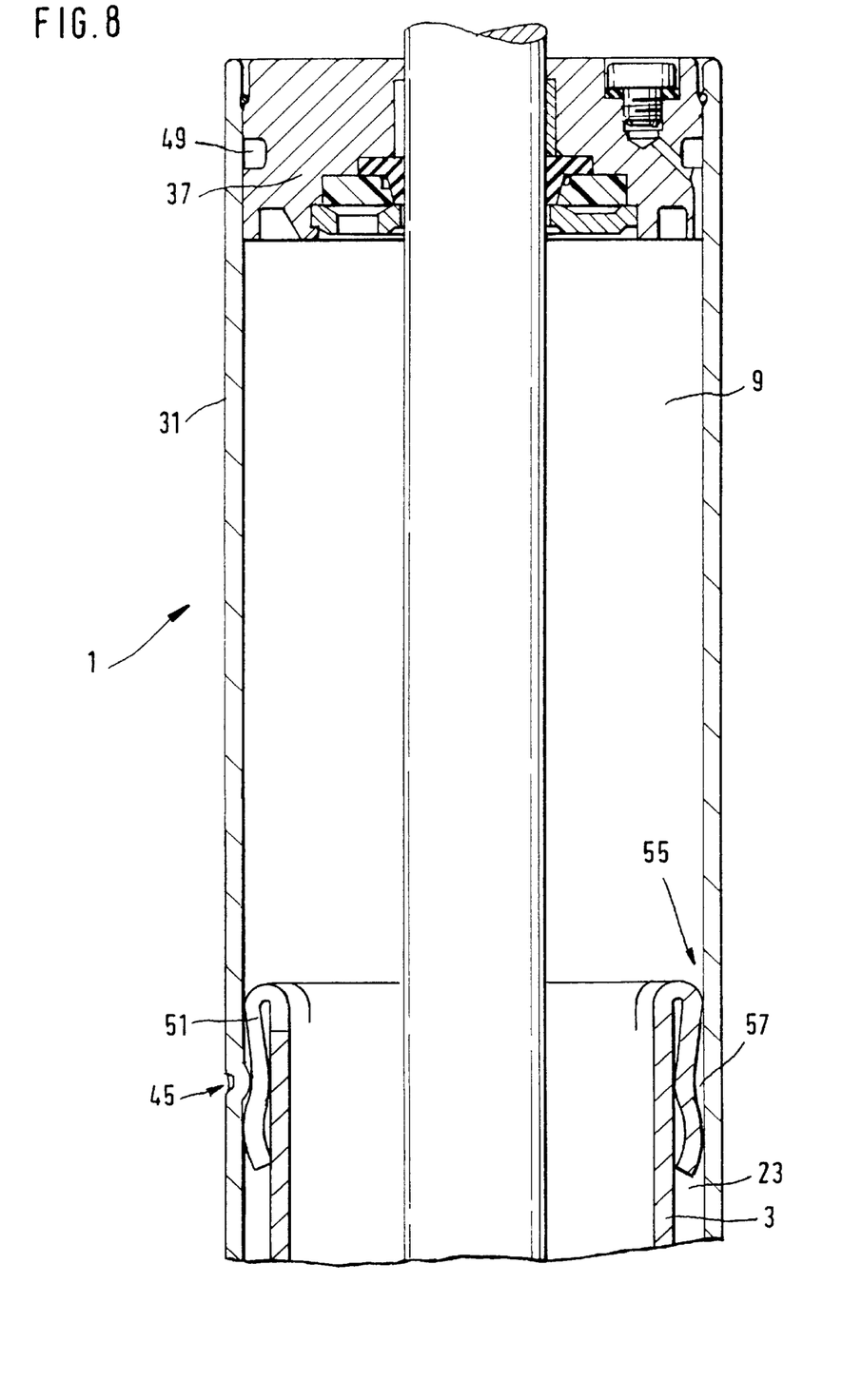

In FIG. 8, the cylinder tube 3, which cylinder tube 3 may have a plurality of slots 51, can be provided with a cylinder tube guide 35 in the form of a collar 55 which has been folded once to form folded webs. The radial dimension can correspond to the cross section of the hydraulic connection 23 between the upper work chamber 9 and the adjustable damping force adjustment valve 21. In the vicinity of the folded webs which run parallel to the container tube wall, there can be a reduced diameter 57, into which partial beads 45 of the container tube 31 are pressed.

In the embodiment, as illustrated in FIG. 8, the plurality of slots 51 in the cylinder tube 3 may be configured differently from the slots 51 in FIGS. 4, 5, 6 and 7. The collar 55 may be formed by folding the cylinder tube 3 once and may serve as the cylinder tube guide 35.

Figure 9:
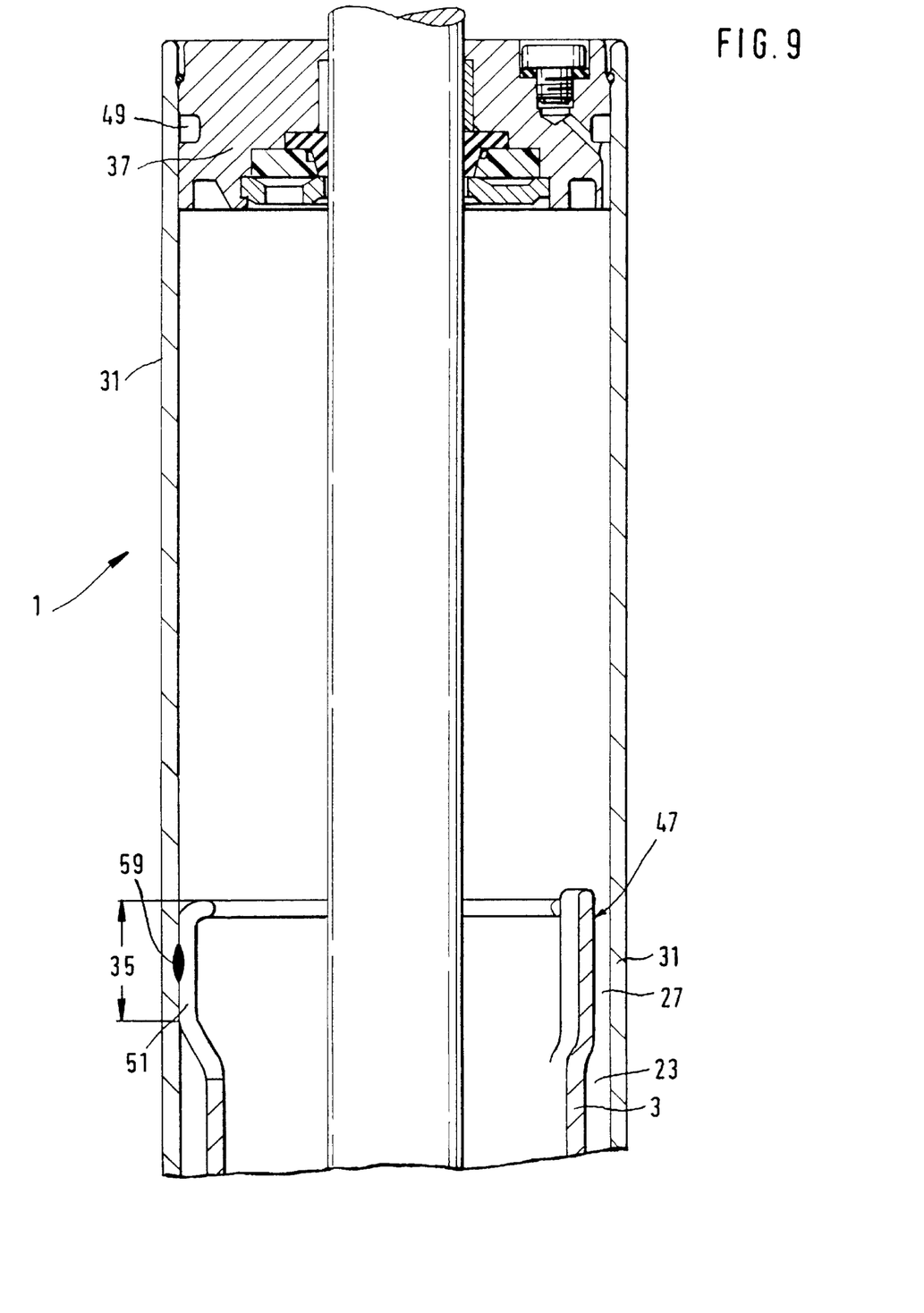

FIG. 9 shows the use of a weld seam 59 as an alternative to or an embodiment of the positive connection 43 (see FIG. 2) between the container tube 31 and the cylinder tube 3. For this purpose, the cylinder tube 3 can be simply introduced into the container tube 31, and the two tubes, i.e. the container tube 31 and the cylinder tube 3, are connected to one another, e.g. by means of a projection weld or a spot weld (represented as weld seam 59). The overflow opening 27 can be an indentation or slot, for example.

One feature of the invention resides broadly in the vibration damper which can have a single-tube construction with an adjustable damping force, comprising a cylinder tube, a piston rod guide inside which a piston rod with a piston is located so that the piston can move axially and divide the cylinder tube into two work chambers, a container tube which encloses the cylinder tube at least in segments, whereby between the cylinder tube and the container tube at least one hydraulic connection running from one of the work chambers by means of an overflow opening to a damping force adjustment valve located outside the container tube is formed, a cylinder tube guide which centers the cylinder tube with respect to the container tube, whereby the damping force adjustment valve has two connection openings, one of which openings is separated from the other by a wall and is connected to the hydraulic connection, characterized by the fact that the container tube 31 extends over the entire length of the hydraulic connection 23 to the piston rod guide 37 and the seal of the container tube 31 is realized on the piston rod guide 37.

Another feature of the invention resides broadly in the vibration damper characterized by the fact that the cylinder tube 3 can have a positive or interlocking retaining connection 43 with the container tube 31 in the vicinity of the cylinder tube guide 35.

Yet another feature of the invention resides broadly in the vibration damper characterized by the fact that the positive connection 43 can be formed by a portion of the cylinder tube 3 with an expanded diameter and at least partial beads 43 of the container tube 31.

Still another feature of the invention resides broadly in the vibration damper characterized by the fact that the overflow opening 27 from the upper work chamber 9 into the hydraulic connection 23 may be formed by an indentation 47 of the cylinder tube guide 35.

A further feature of the invention resides broadly in the vibration damper characterized by the fact that the overflow opening 27 from the upper work chamber 9 into the hydraulic connection 23 can be formed by at least one slot 51 of the cylinder tube guide 35.

Another feature of the invention resides broadly in the vibration damper characterized by the fact that the cylinder tube 3 is preferably connected to the container tube 31 via the cylinder tube guide 35 by means of a weld 59.

Yet another feature of the invention resides broadly in the vibration damper characterized by the fact that the cylinder tube guide 35 is preferably formed by a collar 55 which is folded at least once and has a radial dimension which corresponds to the circular cross sectional area of the hydraulic connection 23.

Still another feature of the invention resides broadly in the vibration damper characterized by the fact that the collar 55 may be formed by slotted webs which have a reduced diameter 57 in the area in which they run essentially parallel to the container tube 31.

Some examples of vibration dampers having damping valve housings which are mounted alongside and externally of the damping cylinder housing and which could be adapted for use in the context of the present invention are to be found in U.S. Pat. Nos. 5,398,789 and 5,462,142 and in U.S. patent application Ser. Nos. 08/500,607, 08/687,686 and 08/687,735, each of these U.S. Patents and Patent Applications being hereby expressly incorporated by reference herein.

Some examples of electromagnetically operated damping valve arrangements which could be adapted for use in the context of the present invention are to be found in U.S. Pat. Nos. 5,449,055, 5,435,421 and 5,335,757 and in U.S. patent application Ser. No. 08/227,156, each of these U.S. Patents and U.S. Patent Applications being hereby expressly incorporated by reference herein.

Some examples of work chamber arrangements which could be adapted for use in the context of the present invention could be disclosed in the following U.S. Pat. Nos.: 5,449,055, 5,435,421, 5,335,757, 5,301,776, 5,251,730, and U.S. patent application Ser. No. 08/410,797, each of these U.S. Patents and Patent Applications being hereby expressly incorporated by reference herein.

Other examples of vibration dampers which could be adapted for use in the context of the present invention, or which have components that could be adapted for use in the context of the present invention, could be disclosed by the following U.S. Pat. Nos. 5,558,189, 5,544,725, 5,501,438, 5,435,421 and 5,335,757, each of these U.S. Patents being hereby expressly incorporated by reference herein.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A shock absorber for a motor vehicle, said shock absorber comprising:

a first tube;

a second tube;

said second tube comprising a first end and a second end;

said first end of said second tube comprising a first connection for connecting to a motor vehicle;

said second end of said second tube being disposed opposite said first end;

said first tube being disposed within said second tube;

a piston;

said piston being disposed to slide in said first tube;

said piston being disposed to form a seal with and within said first tube to divide said first tube into a first chamber and a second chamber;

a piston rod;

said piston rod comprising a first end and a second end;

said first end of said piston rod being connected to said piston;

said second end of said piston rod being disposed opposite said first end;

said second end of said piston rod comprising a second connection for connecting to a motor vehicle;

a piston rod guide being disposed to center said piston rod in said first tube;

said piston rod guide being connected to said second tube;

said piston rod guide being configured to seal hydraulically said second tube with said piston rod guide and to seal hydraulically said piston rod with said piston rod guide;

a valve mechanism;

said valve mechanism being disposed adjacent to said second tube;

means for connecting hydraulically said valve mechanism and at least one of said first chamber and said second chamber; and said connecting means being disposed between said first tube and said second tube.

2. The shock absorber according to claim 1, wherein:

said piston rod guide is disposed at said second end of said second tube to seal hydraulically said second end of said second tube; and said first tube is disposed a substantial distance from said piston rod guide.

3. The shock absorber according to claim 2, further comprising means for interlockingly connecting said first tube to said second tube to position said first tube within said second tube.

4. The shock absorber according to claim 3, wherein:

said means for interlockingly connecting said first tube to said second tube comprises means for guiding said first tube to a position to connect with said second tube;

said first tube comprises an end;

said first tube guiding means comprises structure configured to center said first tube within said second tube; and said structure of said first tube guiding means comprises a portion of said end of said first tube.

5. The shock absorber according to claim 4, wherein said structure of said first tube guiding means comprises at least one opening to permit flow of a damping fluid and said means for connecting hydraulically said valve mechanism comprises said at least one opening.

6. The shock absorber according to claim 5, wherein:

said structure of said first tube guiding means comprises an indented portion;

said indented portion of said structure of said first tube guiding means is configured to form a channel for accommodating flow of damping fluid; and said means for connecting hydraulically said valve mechanism comprises said channel.

7. The shock absorber according to claim 6, wherein:

said means for interlockingly connecting said first tube to said second tube comprises at least one projection;

said at least one projection comprises at least a portion of said second tube;

said at least one projection is disposed to interlock with said structure of said first tube guiding means to connect said first tube to said second tube;

said first tube is configured to contain a damping fluid;

said second tube is configured to contain a damping fluid;

said first tube has a longitudinal axis;

said piston is disposed to slide within said first tube along the longitudinal axis;

said piston comprises at least one damping valve to permit flow of a damping fluid between said first chamber and said second chamber;

said piston rod is disposed to slide in said piston rod guide;

said first chamber is disposed adjacent to said end of said first tube;

said means for connecting hydraulically said valve mechanism is disposed to connect said valve mechanism with said first chamber;

said valve mechanism is configured to permit flow of a damping fluid between said first chamber and said second chamber;

said valve mechanism is disposed outside said second tube;

said valve mechanism comprises a first connection and a second connection;

said first connection of said valve mechanism is disposed to connect said valve mechanism with said means for connecting hydraulically said valve mechanism;

said second connection of said valve mechanism is disposed to connect said valve mechanism with said second chamber;

said shock absorber comprises a wall;

said wall is disposed between said first tube and said second tube;

said wall is disposed adjacent to said valve mechanism;

said wall is disposed to isolate said first connection from said second connection;

said first end of said second tube comprises an equalization chamber;

said shock absorber comprises a separating piston;

said separating piston is disposed to separate said equalization chamber from said second chamber;

said piston rod comprises a spring guide;

said spring guide is disposed on said piston rod between said first tube and said piston rod guide;

said shock absorber comprises a spring; and said spring is disposed between said spring guide and said piston rod guide in an annular space between said first tube and said piston rod guide.

8. The shock absorber according to claim 6, wherein:

said means for interlockingly connecting said first tube to said second tube comprises a weld disposed between said structure of said first tube guiding means and said second tube;

said first tube is configured to contain a damping fluid;

said second tube is configured to contain a damping fluid;

said first tube has a longitudinal axis;

said piston is disposed to slide within said first tube along the longitudinal axis;

said piston comprises at least one damping valve to permit flow of a damping fluid between said first chamber and said second chamber;

said piston rod is disposed to slide in said piston rod guide;

said first chamber is disposed adjacent to said end of said first tube;

said means for connecting hydraulically said valve mechanism is disposed to connect said valve mechanism with said first chamber;

said valve mechanism is configured to permit flow of a damping fluid between said first chamber and said second chamber;

said valve mechanism is disposed outside said second tube;

said valve mechanism comprises a first connection and a second connection;

said first connection of said valve mechanism is disposed to connect said valve mechanism with said means for connecting hydraulically said valve mechanism;

said second connection of said valve mechanism is disposed to connect said valve mechanism with said second chamber;

said shock absorber comprises a wall;

said wall is disposed between said first tube and said second tube;

said wall is disposed adjacent to said valve mechanism;

said wall is disposed to isolate said first connection from said second connection;

said first end of said second tube comprises an equalization chamber;

said shock absorber comprises a separating piston;

said separating piston is disposed to separate said equalization chamber from said second chamber;

said piston rod comprises a spring guide;

said spring guide is disposed on said piston rod between said first tube and said piston rod guide;

said shock absorber comprises a spring; and said spring is disposed between said spring guide and said piston rod guide in an annular space between said first tube and said piston rod guide.

9. The shock absorber according to claim 5, wherein:

said means for interlockingly connecting said first tube to said second tube comprises at least one projection;

said at least one projection comprises at least a portion of said second tube;

said at least one projection is disposed to interlock with said structure of said first tube guiding means to connect said first tube to said second tube;

said first tube is configured to contain a damping fluid;

said second tube is configured to contain a damping fluid;

said first tube has a longitudinal axis;

said piston is disposed to slide within said first tube along the longitudinal axis;

said piston comprises at least one damping valve to permit flow of a damping fluid between said first chamber and said second chamber;

said piston rod is disposed to slide in said piston rod guide;

said first chamber is disposed adjacent to said end of said first tube;

said means for connecting hydraulically said valve mechanism being disposed to connect said valve mechanism with said first chamber;

said valve mechanism is configured to permit flow of a damping fluid between said first chamber and said second chamber;

said valve mechanism is disposed outside said second tube;

said valve mechanism comprises a first connection and a second connection;

said first connection of said valve mechanism is disposed to connect said valve mechanism with said means for connecting hydraulically said valve mechanism;

said second connection of said valve mechanism is disposed to connect said valve mechanism with said second chamber;

said shock absorber comprises a wall;

said wall is disposed between said first tube and said second tube;

said wall is disposed adjacent to said valve mechanism;

said wall is disposed to isolate said first connection from said second connection;

said first end of said second tube comprises an equalization chamber;

said shock absorber comprises a separating piston;

said separating piston is disposed to separate said equalization chamber from said second chamber;

said piston rod comprises a spring guide;

said spring guide is disposed on said piston rod between said first tube and said piston rod guide;

said shock absorber comprises a spring; and said spring is disposed between said spring guide and said piston rod guide in an annular space between said first tube and said piston rod guide.

10. The shock absorber according to claim 5, wherein:

said structure of said first tube guiding means comprises a collar portion;

said collar portion comprises a plurality of folded webs;

each of said plurality of folded webs are disposed to extend parallel to said second tube;

said means for interlockingly connecting said first tube to said second tube comprises at least one projection;

said at least one projection comprises at least a portion of said second tube;

said plurality of folded webs are configured to have a reduced diameter adjacent to said at least one projection to connect said first tube to said second tube;

said first tube is configured to contain a damping fluid;

said second tube is configured to contain a damping fluid;

said first tube has a longitudinal axis;

said piston is disposed to slide within said first tube along the longitudinal axis;

said piston comprises at least one damping valve to permit flow of a damping fluid between said first chamber and said second chamber;

said piston rod is disposed to slide in said piston rod guide;

said first chamber is disposed adjacent to said end of said first tube;

said means for connecting hydraulically said valve mechanism is disposed to connect said valve mechanism with said first chamber;

said valve mechanism is configured to permit flow of a damping fluid between said first chamber and said second chamber;

said valve mechanism is disposed outside said second tube;

said valve mechanism comprises a first connection and a second connection;

said first connection of said valve mechanism is disposed to connect said valve mechanism with said means for connecting hydraulically said valve mechanism;

said second connection of said valve mechanism is disposed to connect said valve mechanism with said second chamber;

said shock absorber comprises a wall;

said wall is disposed between said first tube and said second tube;

said wall is disposed adjacent to said valve mechanism;

said wall is disposed to isolate said first connection from said second connection;

said first end of said second tube comprises an equalization chamber;

said shock absorber comprises a separating piston;

said separating piston is disposed to separate said equalization chamber from said second chamber;

said piston rod comprises a spring guide;

said spring guide is disposed on said piston rod between said first tube and said piston rod guide;

said shock absorber comprises a spring; and said spring is disposed between said spring guide and said piston rod guide in an annular space between said first tube and said piston rod guide.

11. The shock absorber according to claim 5, wherein:

said structure of said first tube guiding means comprises a plurality of metal strips;

said plurality of metal strips being disposed to press against said second tube to connect said first tube with said second tube;

said first tube is configured to contain a damping fluid;

said second tube is configured to contain a damping fluid;

said first tube has a longitudinal axis;

said piston is disposed to slide within said first tube along the longitudinal axis;

said piston comprises at least one damping valve to permit flow of a damping fluid between said first chamber and said second chamber;

said piston rod is disposed to slide in said piston rod guide;

said first chamber is disposed adjacent to said end of said first tube;

said means for connecting hydraulically said valve mechanism is disposed to connect said valve mechanism with said first chamber;

said valve mechanism is configured to permit flow of a damping fluid between said first chamber and said second chamber;

said valve mechanism is disposed outside said second tube;

said valve mechanism comprises a first connection and a second connection;

said first connection of said valve mechanism is disposed to connect said valve mechanism with said means for connecting hydraulically said valve mechanism;

said second connection of said valve mechanism is disposed to connect said valve mechanism with said second chamber;

said shock absorber comprises a wall;

said wall is disposed between said first tube and said second tube;

said wall is disposed adjacent to said valve mechanism;

said wall is disposed to isolate said first connection from said second connection;

said first end of said second tube comprises an equalization chamber;

said shock absorber comprises a separating piston;

said separating piston is disposed to separate said equalization chamber from said second chamber;

said piston rod comprises a spring guide;

said spring guide is disposed on said piston rod between said first tube and said piston rod guide;

said shock absorber comprises a spring; and said spring is disposed between said spring guide and said piston rod guide in an annular space between said first tube and said piston rod guide.

12. The shock absorber according to claim 4, wherein:

said means for interlockingly connecting said first tube to said second tube comprises at least one projection;

said at least one projection comprises at least a portion of said second tube;

said at least one projection is disposed to interlock with said structure of said first tube guiding means to connect said first tube to said second tube;

said first portion of said first tube guiding means comprises an indented portion;

said indented portion of said first tube guiding means is configured to form a channel for accommodating flow of damping fluid;

said means for connecting hydraulically said valve mechanism comprises said channel;

said first tube is configured to contain a damping fluid;

said second tube is configured to contain a damping fluid;

said first tube has a longitudinal axis;

said piston is disposed to slide within said first tube along the longitudinal axis;

said piston comprises at least one damping valve to permit flow of a damping fluid between said first chamber and said second chamber;

said piston rod is disposed to slide in said piston rod guide;

said first chamber is disposed adjacent to said end of said first tube;

said means for connecting hydraulically said valve mechanism is disposed to connect said valve mechanism with said first chamber;

said valve mechanism is configured to permit flow of a damping fluid between said first chamber and said second chamber;

said valve mechanism is disposed outside said second tube;

said valve mechanism comprises a first connection and a second connection;

said first connection of said valve mechanism is disposed to connect said valve mechanism with said means for connecting hydraulically said valve mechanism;

said second connection of said valve mechanism is disposed to connect said valve mechanism with said second chamber;

said shock absorber comprises a wall;

said wall is disposed between said first tube and said second tube;

said wall is disposed adjacent to said valve mechanism;

said wall is disposed to isolate said first connection from said second connection;

said first end of said second tube comprises an equalization chamber;

said shock absorber comprises a separating piston;

said separating piston is disposed to separate said equalization chamber from said second chamber;

said piston rod comprises a spring guide;

said spring guide is disposed on said piston rod between said first tube and said piston rod guide;

said shock absorber comprises a spring; and said spring is disposed between said spring guide and said piston rod guide in an annular space between said first tube and said piston rod guide.

13. A vibration damper having a single-tube construction with an adjustable damping force, said vibration damper comprising: a cylinder tube; a piston rod guide; a piston rod with a piston being located inside said piston rod guide; said piston moving axially and dividing said cylinder tube into two work chambers; a container tube; said container tube enclosing said cylinder tube at least in segments; at least one hydraulic connection being formed between the cylinder tube and the container tube and extending from one of said work chambers by means of an overflow opening to a damping force adjustment valve located outside the container tube; a cylinder tube guide centering the cylinder tube with respect to the container tube; said damping force adjustment valve having two connection openings, one of said openings being separated from the other by a wall and being connected to said hydraulic connection; said container tube extending over the entire length of said hydraulic connection to said piston rod guide; and a seal of said container tube being realized on said piston rod guide.

14. The vibration damper as claimed in claim 13, wherein:

said cylinder tube is disposed a substantial axial distance from said piston rod guide; and said cylinder tube has a positive retaining connection with said container tube adjacent to said cylinder tube guide.

15. The vibration damper as claimed in claim 14, wherein:

said retaining connection is formed by a portion of said cylinder tube with an expanded diameter and at least partial beads of said container tube;

said two work chambers being an upper work chamber and a lower work chamber;

said overflow opening is disposed between said hydraulic connection and said upper work chamber; and said overflow opening from said upper work chamber into said hydraulic connection is formed by an indentation of said cylinder tube guide.

16. The vibration damper as claimed in claim 14, wherein:

said two work chambers being an upper work chamber and a lower work chamber;

said overflow opening is disposed between said hydraulic connection and said upper work chamber; and said overflow opening from said upper work chamber into said hydraulic connection is formed by at least one slot in said cylinder tube guide.

17. The vibration damper as claimed in claim 13, wherein:

said cylinder tube is connected to said container tube by said cylinder tube guide by means of a weld.

18. The vibration damper as claimed in claim 13, wherein:

said cylinder tube guide is formed by a collar, said collar is folded at least once and has a radial dimension which corresponds to a circular cross sectional area of said hydraulic connection; and said collar is formed by slotted webs, said slotted webs have a reduced diameter adjacent to said container tube and extend essentially parallel to said container tube.

19. A method for producing a shock absorber for a motor vehicle, said method comprising the steps of:

providing a container tube sealed on one end and open on another end;

providing a cylinder tube;

forming a cylinder tube guide out of part of said cylinder tube;

inserting an overflow opening on said cylinder tube guide;

inserting said cylinder tube inside said container tube;

fastening said cylinder tube to said container tube;

providing a piston and piston rod assembly;

positioning said piston and piston rod assembly inside said cylinder tube;

providing a piston rod guide;

positioning said piston rod guide at the open end of said container tube; and sealing said container tube with said piston rod guide to form a hydraulic seal.

20. The method of producing the shock absorber for a motor vehicle according to claim 19, comprising:

said step of fastening said cylinder tube to said container tube comprises positioning said cylinder tube a substantial distance from said piston rod guide;

adding damping medium to said container tube and said cylinder tube;

providing a damping force adjustment valve;

attaching said damping force adjustment valve onto said container tube; and said fastening of said cylinder tube to said container tube comprises the steps of:

shaping a first partial bead onto said container tube;

positioning said cylinder tube guide adjacent to said first partial bead; and shaping a second partial bead onto said container tube on the side of said cylinder tube guide opposite said first partial bead to hold said cylinder tube guide in place.

* * * * *